United States Patent
Knothe et al.

[15] 3,656,567
[45] Apr. 18, 1972

[54] PRECISION BALANCE WITH AUTOMATIC LOCKING DEVICE

[72] Inventors: Erich Emil Knothe, Gehrenring; Ludwig Weickhardt, Bovenden, both of Germany

[73] Assignee: Sartorius-Werke GmbH (und vormals Gottinger Prazisionswaagenfabrik GmbH), Gottingen, Germany

[22] Filed: Oct. 28, 1970

[21] Appl. No.: 84,655

[52] U.S. Cl. ........................................177/155, 177/168
[51] Int. Cl. .................................................G01g 23/02
[58] Field of Search.................177/154, 155, 168, 191, 248

[56] References Cited

UNITED STATES PATENTS

| | | | |
|---|---|---|---|
| 2,662,762 | 12/1953 | Meinig | 177/191 X |
| 2,812,173 | 11/1957 | Claridge et al. | 177/154 X |
| 3,055,444 | 9/1962 | Chyo | 177/191 |
| 3,196,968 | 7/1965 | Chappell | 177/248 |
| 3,522,856 | 8/1970 | Weickhardt | 177/168 |
| 3,547,213 | 12/1970 | Knothe et al. | 177/191 X |

Primary Examiner—Richard B. Wilkinson
Assistant Examiner—George H. Miller, Jr.
Attorney—Edmund M. Jaskiewicz

[57] ABSTRACT

The invention relates to balances with a balance beam having bearings and consisting of knife-edges and pans, that must be protected against shock-like loads. A locking device permits the lifting of the bearing knife-edges from the bearing pans. In addition to a locking position and an unlocking position, there is provided a special position where the knife-edges and pans are engaged for a preliminary weighing for the purpose of selecting the weights to be added or removed. There are provided three command switches that actuate a driving motor by means of a control circuit, the motor providing the possibility of bringing the balance into each of the three operating positions. In this connection, care is taken that the balance can be shifted from the special position into the unlocking position and inversely only by passing through the locking position so that in the meantime the knife-edges must necessarily be separated from the pans.

5 Claims, 7 Drawing Figures

PRECISION BALANCE WITH AUTOMATIC LOCKING DEVICE

The invention relates to a precision balance with a balance beam that rests on a knife-edge bearing and is provided with at least one further knife-edge bearing for a suspension of weights. Furthermore, there is provided an automatic locking device which is suitable to bring the balance beam into various operating positions. The locking device is provided with an electric motor that drives a cam disk in order to actuate the locking device. A balance of this kind is known, as for example, from the U.S. Pat. No. 3,196,968.

An object of the invention is to produce a balance of the above-mentioned kind, wherein the balance beam is to be brought into three different operating positions, namely into:
- an unlocking position, wherein the knife-edges and the pans of the two bearings engage each other;
- a locking position, wherein the knife-edges and pans are separated from each other and the balance beam and its weight suspension rest on a locking support; and,
- a special position, wherein the knife-edges and pans are engaged for a preliminary weighing, for the purpose of selecting weights to be added or removed.

A preliminary weighing is carried out in the special position. This can be a gross weighing wherein the bending or lengthening of a spring effects the gross indication of the weight of the load placed on the load pan, while switching weights are lifted. The movement of the balance beam is not limited in such a gross weighing.

In place of this, the preliminary weighing can also be carried out in such a manner that the movement of the beam is limited. Depending on the direction of travel of the scale toward one or the other side, when the load is placed in position, one can see whether weights are to be added or removed.

It is known that, through the employment of a motor, the knife-edge bearings of the balance beam and of the weight suspension can again be engaged in a gentle manner after being separated.

A further object of the present invention is to take care that the balance must always pass through the locking position when passing from the unlocking position into the special position and inversely. This also prevents damages and, in addition, it always provides the reorientation of the knife-edges toward the pans.

According to a further object of the invention, the balance is to be controllable by means of three switches, each possessing, for example, a manually actuated push-button. The invention provides that the locking position must always be traversed, even when the switches are actuated improperly, when the balance is to be brought from the unlocking position into the special position or inversely.

If the balance has a weighing chamber which can be closed by at least one door, this can be employed for the actuation of the three switches, in accordance with a further development of the invention. Preferably, a sliding door is employed for such a purpose.

Other objects and advantages of the present invention will be apparent from the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
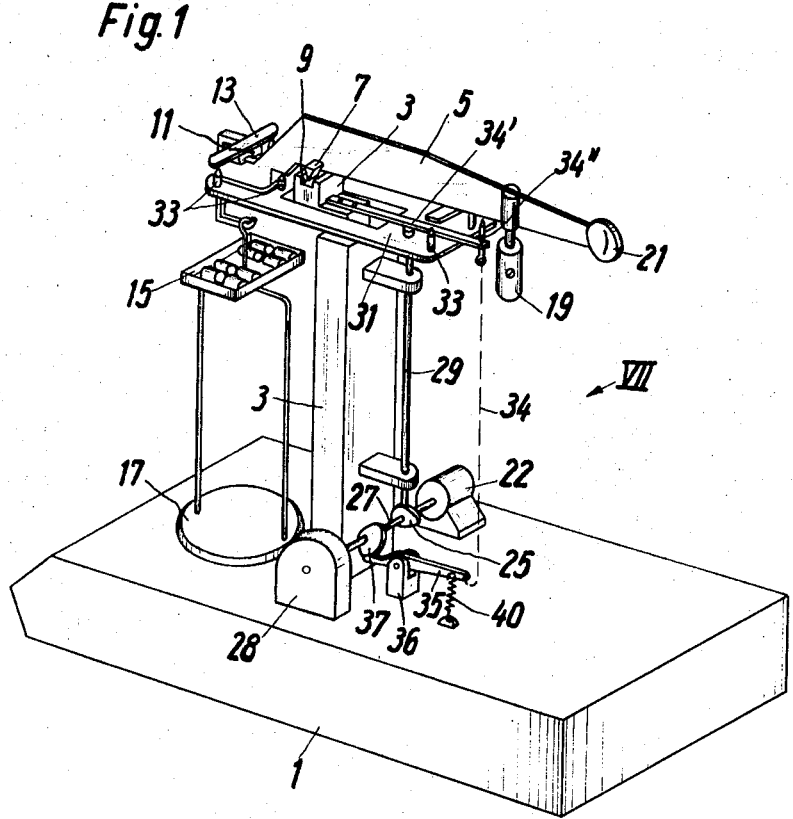
FIG. 1 shows a precision balance in a schematic representation in perspective view.

As shown in FIG. 1, a balance beam 5 is pivoted with a knife-edge 7 on a pan 9 recessed in a bearing support 3 attached to a base plate 1 of the balance. Balance beam 5 carries a load knife-edge 11 at one of its ends, a load suspension 13 with a weight basket 15 carrying switching weights and a load pan 17 resting on knife-edge 11. At the other end of balance beam 5, there are a counterweight 19 and a microscale 21 that is reproduced in part by a projection device (not illustrated) on a focusing ground glass screen that can be observed from outside. Switching weights are removed or added by means of a weight switching device (not illustrated) and the weight that is set is visible in the windows of the read-off device.

A reversible DC motor 22 is attached to base plate 1, the motor driving relatively slowly a camshaft 27, possibly by means of a reduction gearing. The other end of the camshaft is mounted in rotary manner in a switching housing 28 likewise attached to base plate 1. A cam disk 25 is arranged secured against rotation on the camshaft. A lifting rod 29 guided on bearing support 3 rests on the circumference of control disk 25. The rod is connected to a locking support 31 arranged below balance beam 5. When control disk 25 rotates, locking support 31 is lifted or lowered. On its upper side, locking support carries locking pins 33 by means of which balance beam 5 and load suspension 13 can be lifted so that bearing knife-edges 7 and load knife-edge 11 of balance beam 5 are separated from the corresponding pans.

Moreover, in a manner similar to that of the U.S. Pat. No. 3,196,968, a leaf spring 34' is attached to bearing support 3. A setscrew 34' is attached to the free end of the spring and provides a support for balance beam 5. At its lower end, the setscrew has an eye from which a chain 34 passes downward. The lower end of the chain is attached to a lever 35 that is pivotable about a stationary bearing 36 and subjected to the action of a cam disk 37. In the same manner as control cam disk 25, cam disk 37 is fixed against rotation on camshaft 27.

In the position illustrated, locking support 31 is lowered and the two knife-edges and pans engage each other. However, balance beam rests on leaf spring 34'. Accordingly, the balance is in its special position for the gross weighing. An end of a tension spring 40 is connected to base plate 1 and the other end to the right side of lever 35. The spring presses the left end of lever 35 against cam disk 37. The pulling force of spring 40 is sufficient for pulling the right end of leaf spring 34' downward by means of chain 34 when the left end of lever 35 is released by cam disk 37. Chain 34 hangs loosely so that leaf spring 34' can move freely together with beam 5.

Now, a circuit to be described below takes care that the balance can pass from this special position into the unlocking position (wherein the precision weighing is to be carried out) only through the locking position. During the passage through the locking position, control disk 25 lifts locking rod 29 and, therewith, locking support 31, so that the balance beam and suspension 13 rest on the locking support and knife-edges and pans are separated from each other. Cam disk 37 releases lever 35. Chain 34 is tightened under the influence of spring 40 and leaf spring 34' is thus bent downward.

If the movement of the camshaft 27 is continued in the same direction of rotation, the locking support is lowered again; cam disk 37 is still releasing lever 35 in this connection so that the preliminary weighing spring still remains out of engagement with the balance beam.

If the preliminary weighing is performed under a limitation of beam movement, leaf spring 34', chain 34, lever 35 with the parts belonging thereto and cam disk 37 are omitted. Control disk 25 then possesses such a shape that locking support 31 reaches an intermediate level in the special position, i.e. it is neither lowered completely nor lifted so far that the balance beam 5 rests thereon. Rather, it is lifted only so far that the balance beam still possesses a limited free movement. In this special position, the scale read-off will indicate whether the load of the load pan 17 is too small or too large. Switching weights are then added or removed accordingly.

Figure 7:
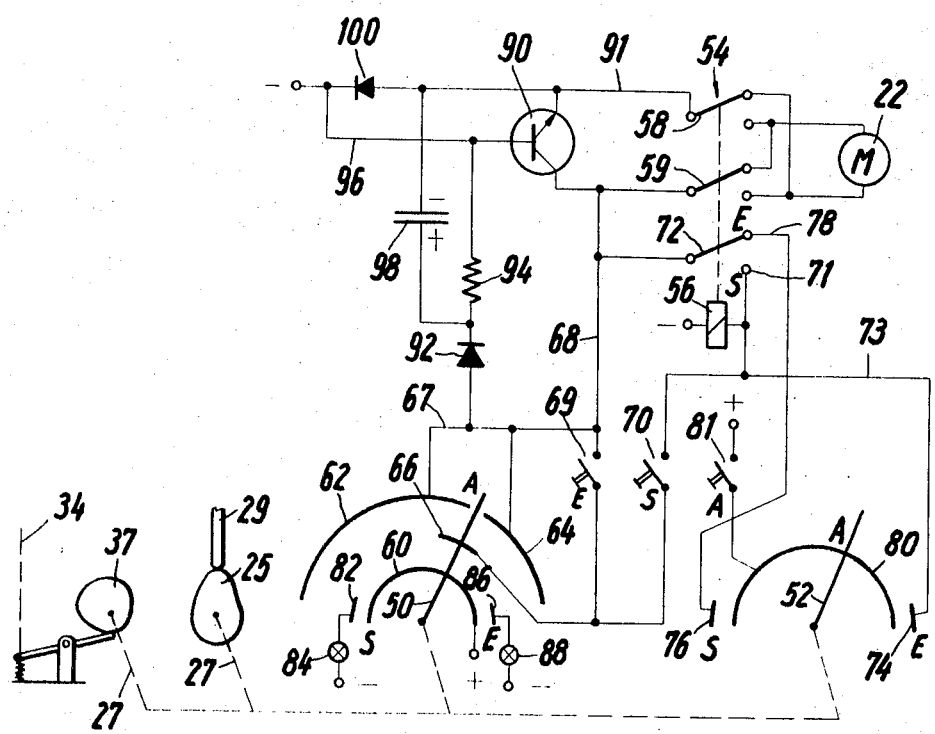
FIG. 7 shows a circuit for actuation of the motor of the locking device.

FIG. 7 shows the corresponding circuit. On the left-hand side there are cam disk 37 and control disk 25, both sitting on camshaft 27, here indicated by interrupted lines. Two sliding arms 50 and 53 rest, secured against rotation, on the same camshaft. Each sliding arm is movable over a field of stationary collecting or sliding ring sectors. Arms 50, 52 and collecting ring sectors are arranged in switching housing 28. The representation of FIG. 7 corresponds to a line of sight VII of FIG. 1.

Driving motor 22 is situated on the four upper contacts of a reversing relay, designated as a unit by a numeral 54. It is actuated by a relay coil 56. Depending on the position of two upper contact arms 58, 59, motor 22 receives current from one or the other direction. The circuit is supplied from a current source of e.g. 6 volts DC. In the circuit, the connections are in each indicated merely by + and −.

A collecting ring sector 60 is situated at the plus pole. By means of sliding arm 50, the sector can be connected to a collecting ring sector 62 or 64 and, in the locking position, also to a collecting ring sector 66. This sector overlaps sectors 62 and 64.

Over lines 67 and 68, sectors 62 and 64 are connected jointly to contact arm 59 and, in addition, to a contact of a manual switch 69(E), which is to bring the device into the unlocking position. Sector 66 is connected to the other side of manual switch 69 and to a side of a manual switch 70(S), which is to bring the device into the special position. The other contact of this switch is situated on a side relay winding 56 and, in addition, on contact 71 of the refersing relay. A contact arm 72 belonging thereto is connected to line 68. Furthermore, contact 71 is connected over a line 73 to a collecting ring sector 74 of the other contact field. This sector is associated with the unlocking position. A corresponding sector 76, associated with the special position, is connected to a contact 78 of the reversing relay.

A collecting ring sector 80 extending through 180 degrees is connected to a contact of a manual switch 81 (A) whose other contact is situated on the plus or positive pole. This manual switch is to bring the device into the locking position.

A collecting ring sector 82 of the left contact field is connected to the minus or negative pole over an indicator lamp 84 and, likewise, a collecting ring sector 86 over an indicator lamp 88. Sector 82 is associated with the special position, sector 86 with the unlocking position. As illustrated in the drawings, sliding arms 50 and 52 are in the locking position.

A npn-transistor 90 serves for short-circuiting the winding of motor 22 after the feed of voltage is disconnected. The emitter thereof is connected over a line 91 to contact arm 58 and the collector thereof to contact arm 59 and line 68. Line 67 is connected over a diode 92 and a resistance 94, of e.g. 500 ohm, to a line 96 leading to the base of the transistor 90, on the one hand, and to the minus pole, on the other hand. A point between diode 92 and resistance 94 is connected over a capacitor 98, of e.g. 100 microfarad, to a line 91. This line leads also to a diode 100 whose other end is placed on the minus pole.

The circuit is in the locking position. Relay winding 56 is without current and the contact arms of the relay are in the position illustrated. Should the device be brought into the unlocking position, manual switch 69 (E) is closed for a brief time. In this manner, the motor receives current over collecting ring sector 60, sliding arm 50, sector 66, manual switch 69 (E), line 68 and contact arm 59, the current flowing further over contact arm 58, line 91 and diode 100 to the minus pole. As soon as contact arm 50 reaches sector 64, line 68 is connected to the plus pole over the said sector and over sliding arm 50 and the operation of the motor continues, after the manual switch 69 (E) was released.

The movement continues until sliding arms 50 leaves sector 64 at the right end, which interrupts the supply of current to the motor. Sliding arm 50 touches then collecting ring sector 86 and feeds current to indicator lamp 88 which indicates the attainment of the unlocking position.

Should the device be brought from the unlocking position into the special position, an operator may close manual switch 70 (S) associated therewith. However, this has no effect since a pole of this manual switch is situated on sector 66, which is now without current, since sliding arm 50 is situated in its extreme position at the right. Therefore, the operator must first close manual switch 81 (A), in order to bring the device into the locking position. When manual switch 81 (A) is closed, collecting ring sector 80 and (over sliding arm 52) sector 74 are connected to the plus pole. Through this, relay winding 56 receives current over line 73 and corresponding contact arms. The motor now receives current over line 73, contact 71, contact arm 72 and contact arm 59. The return way to the minus pole is the same as hitherto described. Since the contact arms of the reversing relay have been switched, motor 22 starts running in the opposite direction. Before sliding arm 52 leaves sector 74, sliding arm 50 touches sector 64, so that the further current supply arm 50 touches sector 64, so that the further current supply is effected over this sector. Also relay winding 56 receives current in this way, namely, over contact arm 72 which, indeed, is now in the lower position. The current supply is interrupted as soon as sliding arm 50 leaves the left end of sector 64, i.e., it returns again into the position illustrated. The motor stops and relay winding 56 loses current so that relay contacts again assume the position illustrated. Subsequently, manual switch 70 (S) is actuated, which effects current supply first over sector 66 and manual switch 70 (S) and to relay winding 56, whereafter the contact arms of the relay are reversed. The motor receives current over contact 71 and contact arm 72. As soon as sector 62 is reached, the current is supplied over this sector and line 67. Here, relay winding 56 receives current over contact arm 72.

As soon as sliding arm 50 leaves the left lower end of sector 62, the current is interrupted so that motor 22 stops. Indicator lamp 84 receives current over sector 82 and indicates the attainment of the special position.

Both in the special position and also in the unlocking position the projection device of the balance receives current over further collecting ring sectors that are not illustrated.

A short-circuit a rangement is provided for the immediate stoppage of the motor after a current interruption. The arrangement contains transistor 90 whose emitter-collector path bridges over switching arms 58, 59. While current flows through the motor, a small voltage drop appears on diode 100. Owing to this, the emitter connection (line 91) has a potential which is positive in relation to the base and the emitter-collector path blocks. During the operation of the motr, capacitor 98, of e.g. 100 microfarad, is charged with the polarity indicated. After the motor current is switched off, capacitor 98 produces a potential difference on lines 91 and 96 (over resistance 94) and namely in such a manner that line 96 is positive in relation to line 91. Accordingly, also the base is positive in relation to the emitter of transistor 90. Therefore, the emitter-collector path becomes conductive and constitutes a short circuit for the motor winding. In this manner, the motor is stopped very rapidly. Since a reduction gearing 38 is also provided, camshaft 27 stops immediately in the desired end position. Diode 92 prevents a discharge of capacitor 98 over lines 67,68, contact arm 59, the motor winding, contact arm 58 and line 91 and the operation of the motor caused by such a discharge.

For the three manual switches 69, 70, 81, three manually actuated keys can be provided on the balance housing. Another arrangement may also be selected in place of the keys.

Figure 2:
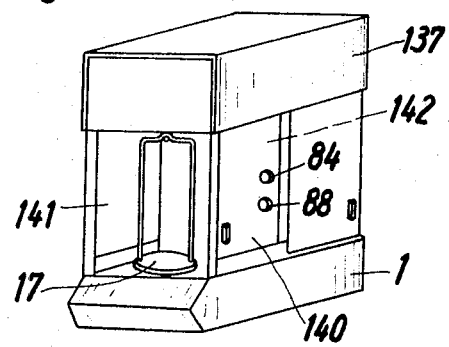
FIG. 2 is a schematic representation of the balance with the balance housing in perspective view.
Figure 3:
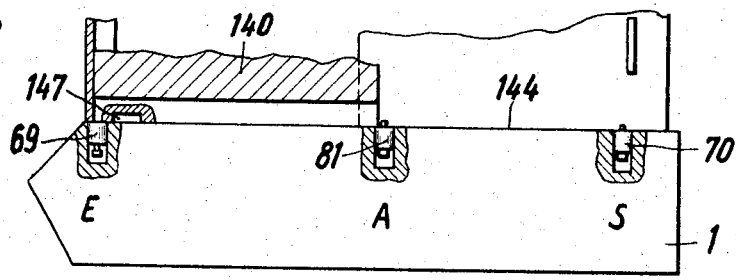
FIGS. 3-5 illustrate various positions of a sliding window on the balance housing, that correspond to the various operating positions of the locking device.
Figure 4:
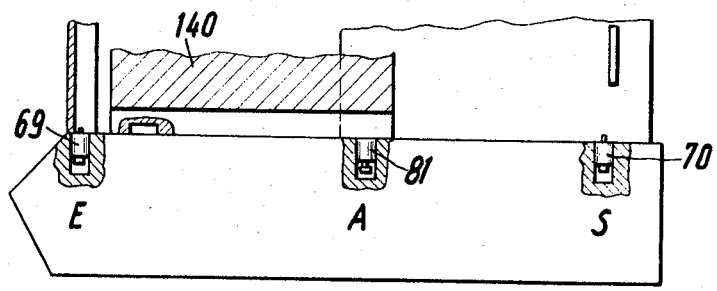

FIGS. 2–4 show a balance arranged in a balance housing 137 with sliding doors 140 and 141. Two indicator lamps 84 and 88 are arranged on a rear wall 142 of the weighting chamber.

Figure 5:
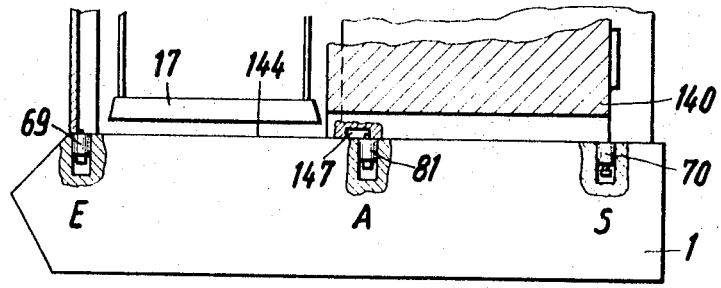

As shown in FIGS. 3–5, switches 69, 70 and 81 are arranged in base plate 1, namely below a guide rail 144 for a sliding window 140. Push-buttons of the switches are pushed upward by a spring, in each case, and can be pushed downward when the window is slid over the buttons. When the buttons are depressed, switches are closed. When sliding window is completely closed, as in FIG. 3, only switch 69 (E) for the unlocking position is closed, when the window is opened completely, as in FIG. 5, merely switch 70 (S) for the intermediate position is closed. If the window is in a central position, e.g. as in FIG. 4, merely switch 81 (A) for the locking position is closed. With the window length illustrated, it is expedient to provide a recess 147 which stretches over switch 81 (A) in the arrangement of FIG. 5, so that the said switch is open.

As it can be seen, the arrangement is such that the weighing chamber is completely closed when the balance is unlocked, i.e., when a precision weighing is carried out. Weighing pan 17 is then protected against air currents and dust. On the other hand, the opening of the weighing chamber in the two other positions is of no significance, since here one does not require such a high sensitiveness of the balance. In particular, it is expedient that the sliding window is open in the locking position since the weighing pan is loaded and relieved of load in the locking position.

For left-handed operators, the switches may be arranged on left-sliding window 141 instead of the arrangement on the right sliding window. Switches can also be arranged on both sliding windows but care must be taken in such a case that the unlocking position can only be reached when both switches 69 (E) are closed. This can be attained readily through a series-connection of the contacts of the two switches. On the other hand, a special circuit must be provided in order to take care that a mere displacement of one of the sliding windows into the rearward end position or an intermediate position is sufficient for bringing the device into the special position or the locking position.

Figure 6:
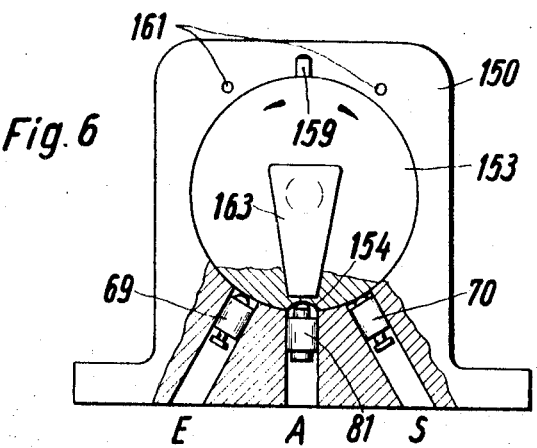
FIG. 6 shows a rotary element by means of which the three switches can be actuated.

FIG. 6 shows another type of switch actuation. Here, switches 69, 81, 70 are arranged in an body 150 firmly connected to the balance housing. Each switch possesses a push-button subjected to the upward pressing tendency of a spring that is not illustrated here. If the push-button is above, the switch is closed and inversely. A manually actuated rotary disk 153 is arranged in a cylindrical cavity of element 150 and acts on the push-buttons of the three switches. The disk is provided with a recess 154 that can release one of the three push-buttons so as to close the corresponding switch. Two stops 161 limit the movement of a pin 159 and, therewith, of rotary disk 153. Rotary disk 153 can be rotated by means of a hand knob 163 having simultaneously the shape of a pointer.

The embodiments of FIGS. 2-6 possesses the advantage that the user can operate the locking revice in a simpler manner than with the actuation of three separate switches. For example, if the user wants to bring the balance from the special position into the unlocking position, he can shift the window directly from the position of FIG. 5, into the position of FIG. 3 or turn hand knob 163 from its right end position into its left end position. In this connection, switch 70 (S) is opened first and switch 81 (A) is then closed. The motor is started and sliding arm 50 of FIG. 7 moves from the left on collecting ring sector 62, so that supply of current to the motor is continued, even when switch 70 (S) is opened again.

It is merely required that rotary disk 153 be moved so slowly over switch 81 (A) that sliding arm 50 has sufficient time for reaching sector 62. While sliding arm 50 is still on sector 62, switch 69 (E) can be closed already which produces no effect initially. Current cannot be supplied through switch 69 (E) until sliding arm 50 reaches sector 66. When this is reached, the device can pass through the locking position without an interruption in the motor operation.

In the case of a weighing-in operation, wherein the material to be weighed is delivered onto weighing pan 17 until a certain weight is reached, on a balance in which the three switches are operated by means of the sliding window, such an operation must be performed in the unlocking position but with the sliding window open. In order to make this possible, a special manual switch can be provided; a contact thereof bridges over switch 69. This contact is then closed although the window is opened, so that the unlocking position is reached. The window is not opened completely so that the switch 81 is actuated. However, in order to prevent that the device reaches the locking position, the above-mentioned additional manual switch possesses an interruption contact situated in series with switch 81.

In place of switches 69, 81, 70, light beam barriers can also be employed, the barriers being so connected as to close a contact when the light beam is interrupted. In such a case, the sliding window possesses at least on opaque spot interrupting in each case only one of the light barriers.

It will be understood that this invention is subject to modifications in order to adapt it to different uses and conditions and, accordingly, it is desired to comprehend such modifications within this invention as may fall within the scope of the appended claims.

What is claimed is:

1. A precision balance with a balance beam (5) resting on a knife-edge bearing (7) and possessing at least one further knife-edge bearing (11) for a weight suspension (13), an automatic locking device (29, 31) which is suitable to bring the balance beam into three different operating operational positions, and namely into:

an unlocking position, wherein the knife-edges and pans of the two bearings engage each other and the beam is freely movable, a locking position wherein the knife-edges and pans are separated from each other and the beam and its weight suspension rest on a locking support, and a special position wherein the knife-edges and pans are engaged, but the beam has only a limited freedom of movement, a reversible, electric driving motor (22), which drives a cam device (25,37), at least one follower member (29,35) for the cam device, which member transmits the motion to a device (31,34') that exerts an effect on the range of movement of balance beam (5), the device containing a locking support (31), three command switches (69,70,81), of which each is associated with one of the three operational positions, a control circuit (FIG. 7) which, after the actuation of one of the command switches, permits the starting of motor (22) in a direction such that it brings the device exerting an effect on the range of movement of the balance beam into the corresponding position, by means of the cam device, collecting ring sectors (62,64,66;76,80,74) that cooperate with at least one sliding arm (50,52) driven by the motor, two of the sectors (64,74) being associated with the unlocking position and take care of the motor operation in a specific direction, other sectors (62,76) being associated with the special position and take care of the motor drive in the other direction and an intermediate space between these sectors being associated with the locking position, in such a manner that the locking position must be traversed in the case of transition from the unlocking position to the special position and inversely.

2. A precision balance as in claim 1 wherein a current feed leads to command switches (69,70,81) for the unlocking position and the special position over a collecting ring sector (66) associated with the locking position, in such a manner that the said manual switches are effective only in the case where one of sliding arms (50) contacts sector (66).

3. A precision balance as in claim 1, with a rotary element (153) that can be turned by hand to and for between two end positions and is provided with an actuation member (154) for the three switches (69,70,81) arranged on the circumference thereof, switch (69) for the unlocking position being actuated in a specific end position of the rotary element, switch (70) for the special position in the other end position and switch (81) for the locking position in at least one intermediate position of the rotary element.

4. A precision balance as in claim 1, with a weighing chamber that can be closed by at least one door, the actuation members for the three switches (69,70,81) being arranged within the range of movement of the door, in such a manner that switch (69) for the unlocking position is actuated only in the case where the door is closed completely, switch (70) for the special position only in the case where the door is opened completely and switch (81) for the locking position in the intermediate positions of the door.

5. A precision balance as in claim 4, wherein the door is a sliding door (or a sliding window 140,141) which is guided in rails (144), switches (69,70,81) being pressure switches arranged on at least one of the rails, the actuation members of the switches projecting into the path of travel of the sliding door, and wherein the actuation members are so arranged along the rail that only one of the switches may ever be actuated simultaneously by the door.

* * * * *